May 23, 1961 W. N. BENNETT 2,985,031
REMOTE CONTROL FOR MOTOR BOATS
Filed Nov. 13, 1958 2 Sheets-Sheet 1
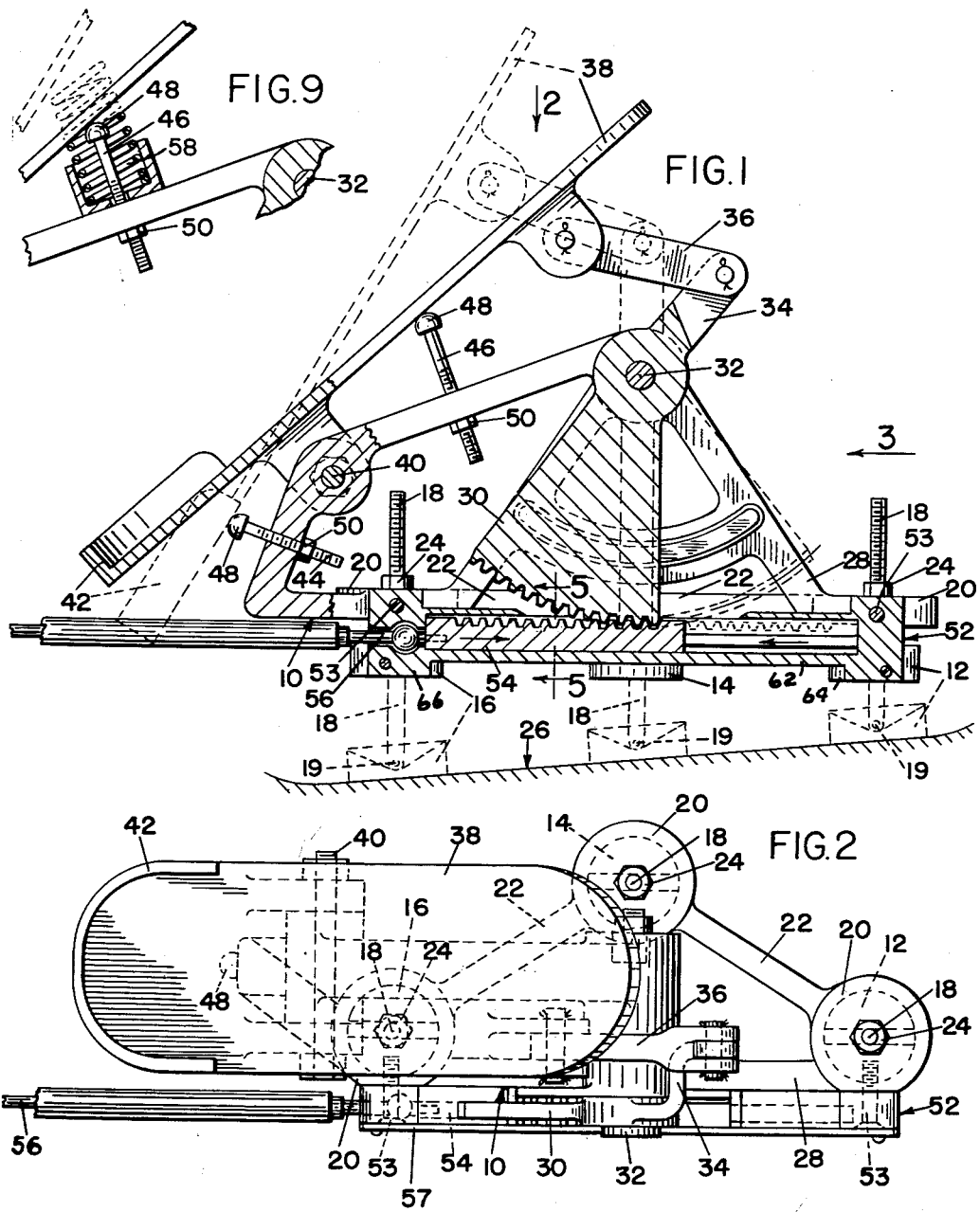
INVENTOR
WM. N. BENNETT
ATTORNEY

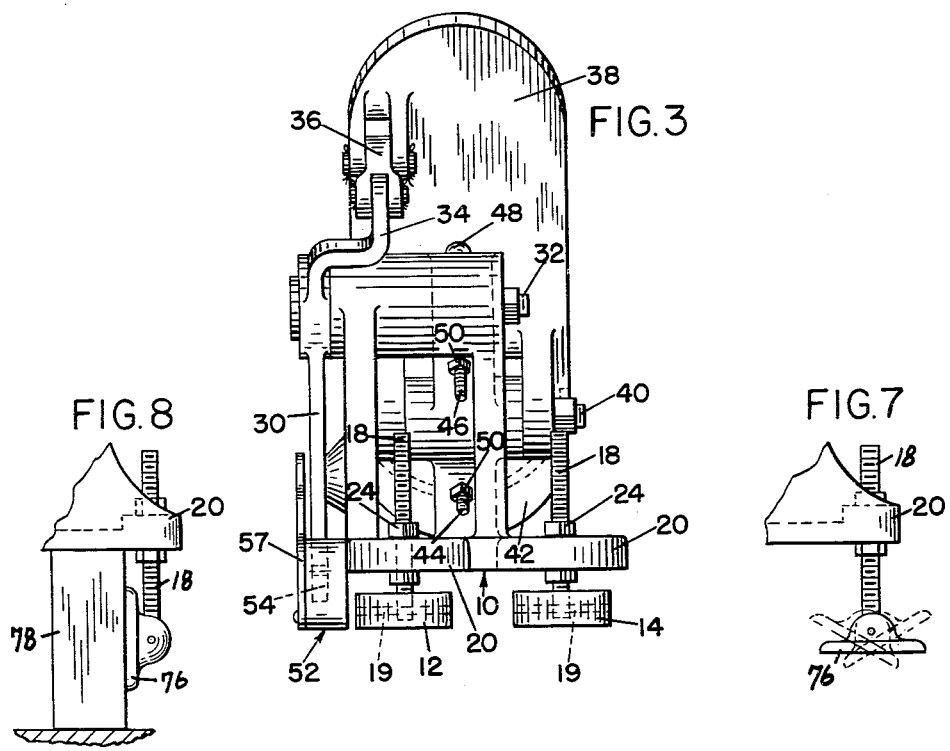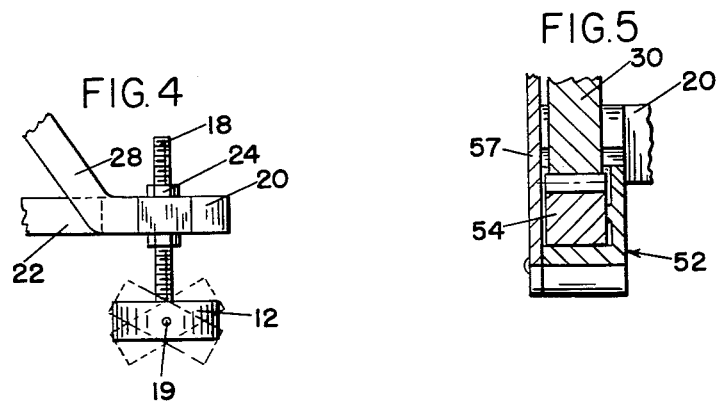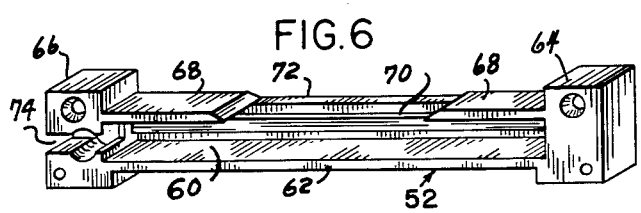

United States Patent Office 2,985,031
Patented May 23, 1961

2,985,031

REMOTE CONTROL FOR MOTOR BOATS

William N. Bennett, Charlestown, N.H.

Filed Nov. 13, 1958, Ser. No. 773,581

12 Claims. (Cl. 74—512)

This invention relates to a remote control to be actuated by the foot and is particularly adapted for control of outboard motors for motorboats although it could be adapted to inboards also.

The principal object of the invention resides in the provision of a remote control foot-operated throttle or other control to simplify present known prior art remote controls for easier and much safer operation of small powered craft; and the provision of a foot throttle allowing the operator to control the boat speed even while shifting the motor clutch with one hand and steering with the other so that there is not possible loss of steering control particularly in making high speed turns and while docking the boat.

In the usual operation especially of high speed motorboats, there is a motor gear shift lever, steering wheel and motor throttle control, all of which have to be operated simultaneously, or as close to simultaneously as it is possible to do, while making high speed turns and in docking the boat, and obviously it is impossible to adequately control the boat because of the fact that the operator must have one hand on the steering wheel at all times. This invention provides for the control of the motor speed by the foot, the clutch by one hand, and the steering by the other hand, so that the boat is under complete control at all times.

Other objects of the invention include the provision of a novel unit which may be installed in any boat and is adjustable for level mounting to any internal boat contour, this unit being mounted on the floor of the boat, this position requiring the operator to be safely seated while operating the device rather than allowing the operator to stand up, an unsafe position, as is the case in prior art devices using hand control; the provision of a pivotally mounted pedal having means to hold the same in a pre-set condition so that the operator may adjust the foot pedal to the degree desired and have it stay in such position until it is deliberately changed by means of the foot; the provision of adjustable pre-set stops for control of idling and high speed operation, and the provision of an interchangeable panel adapting the foot throttle for all makes of motors presently equipped with remote control cables.

The invention further relates to arrangements and combinations of parts which will be hereinafter described and more particularly set forth in the appended claims.

Reference is to be had to the accompanying drawings, in which

Fig. 1 is a view in elevation illustrating the device in use, parts being in section;

Fig. 2 is a top plan view thereof, looking in the direction of arrow 2 in Fig. 1;

Fig. 3 is an end view, looking in the direction of arrow 3 in Fig. 1;

Fig. 4 is a detail view of one of the adjustable pads;

Fig. 5 is an enlarged section on line 5—5 of Fig. 1;

Fig. 6 is a perspective view of a guide panel;

Fig. 7 is a view of a modified pad;

Fig. 8 is a view of the pad of Fig. 7 in vertical position; and

Fig. 9 shows a treadle return device.

In carrying out the present invention, there is provided a foot throttle base which is adapted to be mounted in generally horizontal position upon three vertically adjustable leveling pads, these being indicated at 12, 14 and 16. Each pad is swivelly mounted on a separate rod 18 by means of a pin 19 and the rods are vertically and rotatably adjustable in corresponding bosses individually indicated at 20. The bosses 20 are connected preferably to form a three-point support, as by appropriate members 22, the latter forming part of the foot throttle base 10.

Appropriate nuts 24 are provided on the rods 18 for locking the same in vertically adjusted position wherever the pads 12, 14 and 16 come to rest with relation to the bottom of the boat, here indicated as at 26 in Fig. 1. It will be seen therefore that the foot throttle base 10 may be located in horizontal position in any boat, regardless of the contour of the bottom thereof. As shown in Fig. 6, these pads may be made to attach to the vertical side of a rib 25 as shown at 27 by the use of a pivot boss 29.

At 28 there is a bridge or the like which extends upwardly as seen in Fig. 1 and this forms a support for a journal for a sector gear 30 as by a pin 32. This sector gear is provided with an arm 34 pivotally connected with a link 36 in turn pivotally connected to a treadle member 38.

The member 28 may be conveniently made in the general form of a vertical triangle and it includes a journal as at 40 for the foot treadle 38.

It will be observed that the foot treadle 38 extends below the axis of pivot 40 and is provided with a heel piece at 42. This treadle is adapted to be frictionally held in position wherever set by the foot as indicated between the idle position in dotted lines, the treadle being in fast position in full lines in Fig. 1. Also, the base provides for a pair of adjustable pre-set stops for idling and fast speed as at 44 and 46 respectively, these being provided with heads 48 and having adjustable nuts 50 to hold them in the desired position.

Mounted at the side of the base there is a panel generally indicated at 52, this panel having a guideway and being interchangeable for different kinds of control cables for different manufacturers of outboard motors. The panel may be mounted in any way desired as by screws 53, etc., to the side of the base and it slidably holds a rack indicated at 54 in the guideway. Rack 54 is in mesh with the sector 30 and has connected thereto the cable 56 which goes to the motor and controls the throttle thereof. The cable and rack is supplied by the manufacturer of the motor and therefore different panels are provided for slidably holding different racks. The rack is held in the guideway of the panel by a cover 57.

In the operation of the device, the treadle may be moved where desired by the toe and in any position wherever it is placed it will stay due to friction of the parts. The stops limit the motion of the treadle in idle and in full speed positions and through the intermediary of link 36 the sector 30 is moved to in turn move the rack 54 in a desired direction for imparting the change of speed to the throttle of the motor.

The speed being set by the toe of the foot, it is only necessary to depress the heel to bring the treadle back to idle position, or to reduce speed short of idling. In some cases a return spring 58 is used, especially in racing and as a safety factor for young or inexperienced drivers.

The stop 46 is easily adjusted to prevent use of the motor at full speed. That is, the device may be set to allow only a part such as half or quarter speed of the engine to be used.

The cable 56 goes directly back to the motor and does not loop along the dash or the sides of the boat so that no kinking or sticking of the Bowden wire is likely, and this is achieved because of the present construction in moving the rack in the indicated direction.

The motor itself is not shown, as the throttle and remote control cables for these motors are well known in the art; but in any event, the rack is movable in either direction in order to control the throttle of the motor as above stated. By means of the adjustable and pivotable pads, the device is adapted to be mounted for instance by adhesives or screws in any position desired on any contour of boat bottom. Also, covers may be provided to enclose the rack and the sector gear and the rack have a keyway for being slidably guided by the removable panel 52.

This panel is shown in some detail in Fig. 6. The guideway which slidably guides the rack 54 is indicated by the reference numeral 60 and it is provided with a bottom member clearly shown at 62 extending between a pair of enlargements or bosses 64, 66. There is a top cover member 68 which is interrupted by a gap at 70 for the reception of the toothed portion of the sector 30. Also, of course, the panel is provided with a rear member at 72, being open at the front, this front being closed as stated above by the cover member 57. The enlargements 64 and 66 receive the fastening members 53 and the enlargement 56 has an opening at 74 to which the cable to the motor extends as clearly shown in Fig. 1.

As shown in Figs. 7 and 8, the threaded rods or pins 18 may be provided with a different kind of universally pivoted foot or pad 76 which is adapted to be applied to vertical ribs as at 78 as well as to horizontal or inclined members.

It will be seen from the above that this invention provides for a relatively simple practical solution to the problem of providing foot-actuated throttle control members for boats, and particularly for outboard motors. It is to be distinctly understood that the panel 52 is made a little different for different manufacturers of outboard motors who ordinarily supply their own cables and racks for the purpose of providing remote control. This invention provides for interchangeability of these panels so that any outboard motor may be directly controlled by its cable as supplied by the manufacturer simply by using a removable guide panel member of a little different construction in order to accommodate the particular rack, cable, etc. as supplied by the manufacturer of the motor, and the present invention does not contemplate the provision of such devices since they are already well recognized and available to the public.

Also, the removable panel provides for a straight substantially rectilinear motion of the cable and arrangement thereof on the bottom of the boat, rather than the usual method of providing the same to extend around corners, in loops, etc., as the cable itself extends directly in a straight line from the devices which comprises the present invention to the motor itself in the rear of the boat; or of course, if an in-board motor is used, the cable will go directly to the carburetor thereof without the necessity of passing around the corners and in loops, etc.

Having thus described my invention and the advantages thereof, I do not wish to be limited to the details herein disclosed, otherwise than as set forth in the claims, but what I claim is:

1. A device of the class described comprising a base, a plurality of adjustable legs mounted on said base, a pad on each leg, said pads being substantially universarlly adjustable relative to the legs for application to a contoured surface, a pivoted foot treadle mounted on the base, a sector gear on the base, a link connecting said foot treadle to said sector gear to oscillate the latter, a rack, means on the base to rectilinearly guide and constrain said rack, said sector gear being in engagement with the rack to move the same, and a motor control cable secured to the rack for actuation thereby in conformance to the motion of the treadle.

2. A device of the class described comprising a base, a detachable and replaceable panel thereon, a guideway in said panel, said guideway being adapted to slidably receive a removable and replaceable toothed member attached to the cable of a remote control unit, movable toothed means on said base in engagement with said toothed member for operating the same and moving the same in a path guided by said panel, and means on the base to mount the same in desired position on an irregular surface.

3. A device of the class described comprising a base, a detachable and replaceable panel thereon, a guideway in said panel, said guideway being adapted to slidably receive a toothed member attached to the cable of a remote control unit, movable toothed means on said base in engagement with said toothed member for operating the same and moving the same in a path guided by said panel, means including a foot-operated treadle pivotally mounted on said base to actuate the toothed means, and means on the base for universal mounting thereof with respect to an irregular surface.

4. A device of the class described comprising a base, a detachable and replaceable panel thereon, a guideway in said panel, said guideway being adapted to slidably receive a toothed member attached to the cable of a remote control unit, movable toothed means on said base in engagement with said toothed member for operating the same and moving the same in a path guided by said panel, and means including a foot-operated treadle pivotally mounted on said base to actuate the toothed means, the pivoted axis of said treadle being intermediate the ends thereof, whereby it is moved in one direction to move the member in one direction and in the other direction to move the member in a reverse direction.

5. A device of the class described comprising a base, means to mount the base on a curved surface, a toothed member movably mounted thereon, operator operated means for moving said toothed member, a removable replaceable guide panel detachably mounted on said base, a rack, said guide panel including a guideway to slidably receive the rack, and a cable attached to said rack, said member being in mesh with said rack and moving the same rectilinearly to move said cable upon actuation of said operator operated means.

6. A control device for an internal combustion engine comprising a base, a plurality of members adjustably mounted on said base, a swivelly mounted pad or foot on each of said adjustable members, means to adjust and hold said members in adjusted position for application thereto to an uneven supporting member, a guideway on said base, a member slidably guided in said guideway, a control cable for the engine, said cable being secured to said member, means on said base for actuating said member and moving the same rectilinearly in either of two opposite directions.

7. A control device for a marine engine comprising a base, a plurality of members adjustably mounted on said base, a swivelly mounted pad or foot on each of said adjustable members, means to adjust and hold said members in adjusted position for application thereto to an uneven supporting member on a boat, an open-sided guideway panel on said base, a member slidably guided in said guideway panel, an engine control cable for securement to said member, means on said base for actuating said member and moving the same rectilinearly in either of two opposite directions, and means to close the guideway.

8. A control device for marine engines comprising a base, a plurality of members adjustably mounted on said base, a swivelly mounted pad or foot on each of said adjustable members, means to adjust and hold said members in adjusted position for application thereto to a boat having an uneven supporting member, a guideway on said base, a member slidably guided in said guideway, a cable for securement to said member, means on said base for actuating said member and moving the same rectilinearly in either of two opposite directions, said adjusting means being adapted to hold said base in a substantially horizontal position on the boat, and said member actuating means being foot-operated.

9. A remote control device for an outboard engine comprising a base, means to mount said base on any surface of a boat, a detachable guide panel on said base, means to detachably mount said guide panel on said base, said panel being removable and replaceable, a slidable device on said guide panel, said device being attached to a remote control cable for the engine, and means on the base for rectilinearly moving said device, said last-named means being operator operated, and including a foot treadle mounted on a pivot intermediate the ends thereof for actuation of said treadle in one direction by the toe of the used and in the other direction by the heel of the user, said pivot being mounted on the base.

10. A device of the class described comprising a base, a plurality of pin-like members mounted on said base, said pin-like members being slidably mounted in a direction transverse to the general plane of the base, means to lock said pin-like members in adjusted positions, the pin-like members being rotatable, a pad on the end of each pin-like member, said pads being substantially universally mounted with respect to the base and capable of supporting said base in substantially horizontal position on the bottom of a boat, and means on said base for the remote control of an internal combustion engine on the boat.

11. A device of the class described comprising a base, a plurality of pin-like members mounted on said base, said pin-like members being slidably mounted in a direction transverse to the general plane of the base, means to lock said pin-like members in adjusted positions, the pin-like members being rotatable, a pad on the end of each pin-like member, said pads being substantially universally mounted with respect to the base and capable of supporting said base in substantially horizontal position on the bottom of a boat, and means on said base for the remote control of an internal combustion engine on the boat, said last-named means including a sector and rack, and means for moving said sector to in turn rectilinearly move the rack to accomplish the control function.

12. A device of the class described comprising a base, a plurality of pin-like members mounted on said base, said pin-like members being slidably mounted in a direction transverse to the general plane of the base, means to lock said pin-like members in adjusted positions, the pin-like members being rotatable, a pad on the end of each pin-like member, said pads being substantially universally mounted with respect to the base and capable of supporting said base in substantially horizontal position on the bottom of a boat, and means on said base for the remote control of an internal combustion engine on the boat, said last-named means including a removable panel having a guideway therein, and a rack in the guideway, said rack and panel being removable and replaceable by a different rack and panel.

References Cited in the file of this patent

UNITED STATES PATENTS

| | | |
|---|---|---|
| 167,964 | Weld | Sept. 21, 1875 |
| 478,763 | Savage | July 12, 1892 |
| 1,150,162 | Arnold | Aug. 17, 1915 |
| 1,152,101 | Kaufman et al. | Aug. 31, 1915 |
| 1,473,984 | Bailhe | Nov. 13, 1923 |
| 1,740,267 | Remington | Dec. 17, 1929 |
| 1,877,367 | Seppmann | Sept. 13, 1932 |
| 2,422,320 | Troemel | June 17, 1947 |
| 2,482,550 | Koertge et al. | Sept. 20, 1949 |
| 2,492,213 | Eder et al. | Dec. 27, 1949 |
| 2,631,469 | Oliner et al. | Mar. 17, 1953 |
| 2,710,547 | Davenport | June 14, 1955 |
| 2,749,872 | Amick | June 12, 1956 |
| 2,757,553 | Marr | Aug. 7, 1956 |